No. 792,991. Patented June 20, 1905.

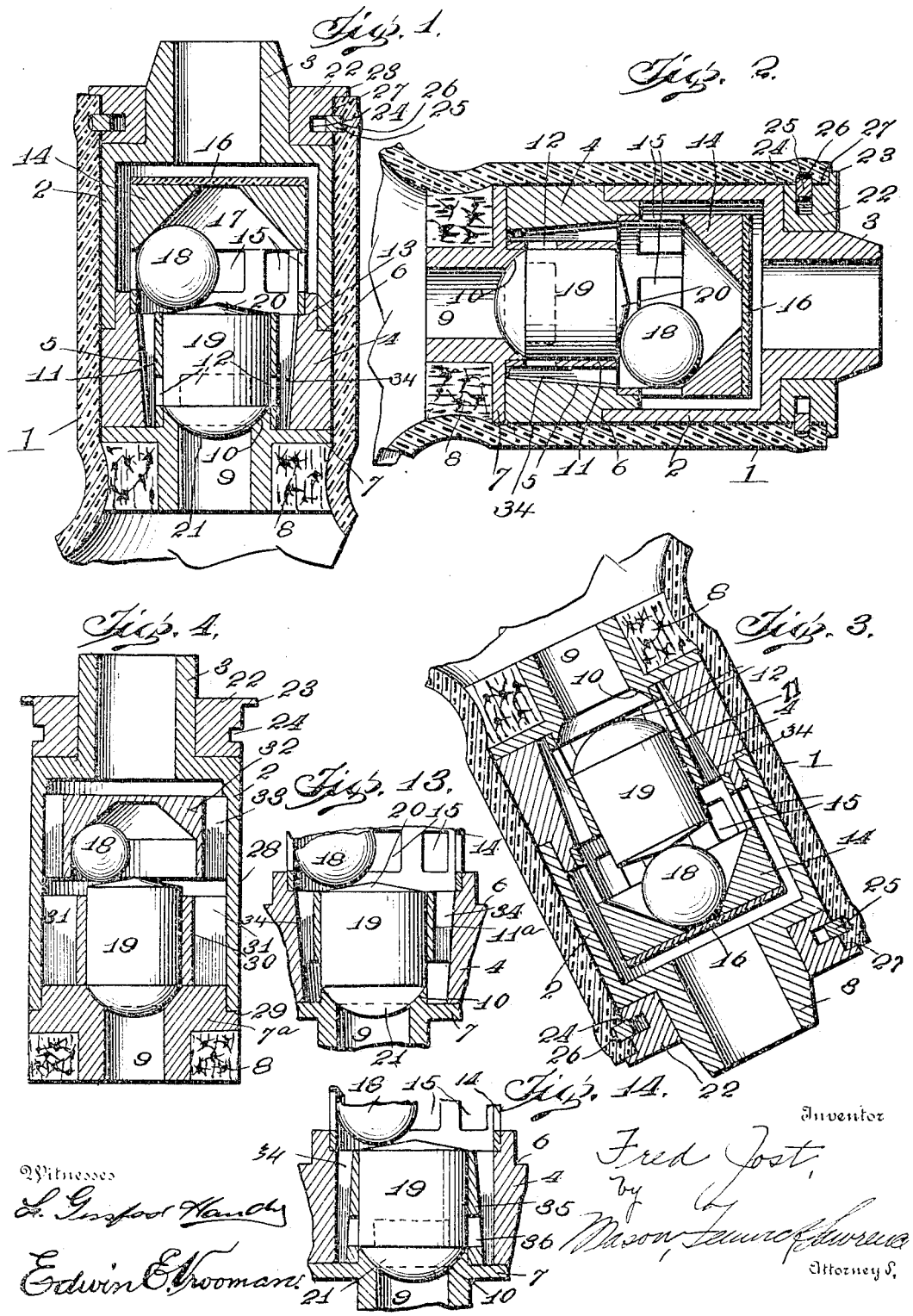

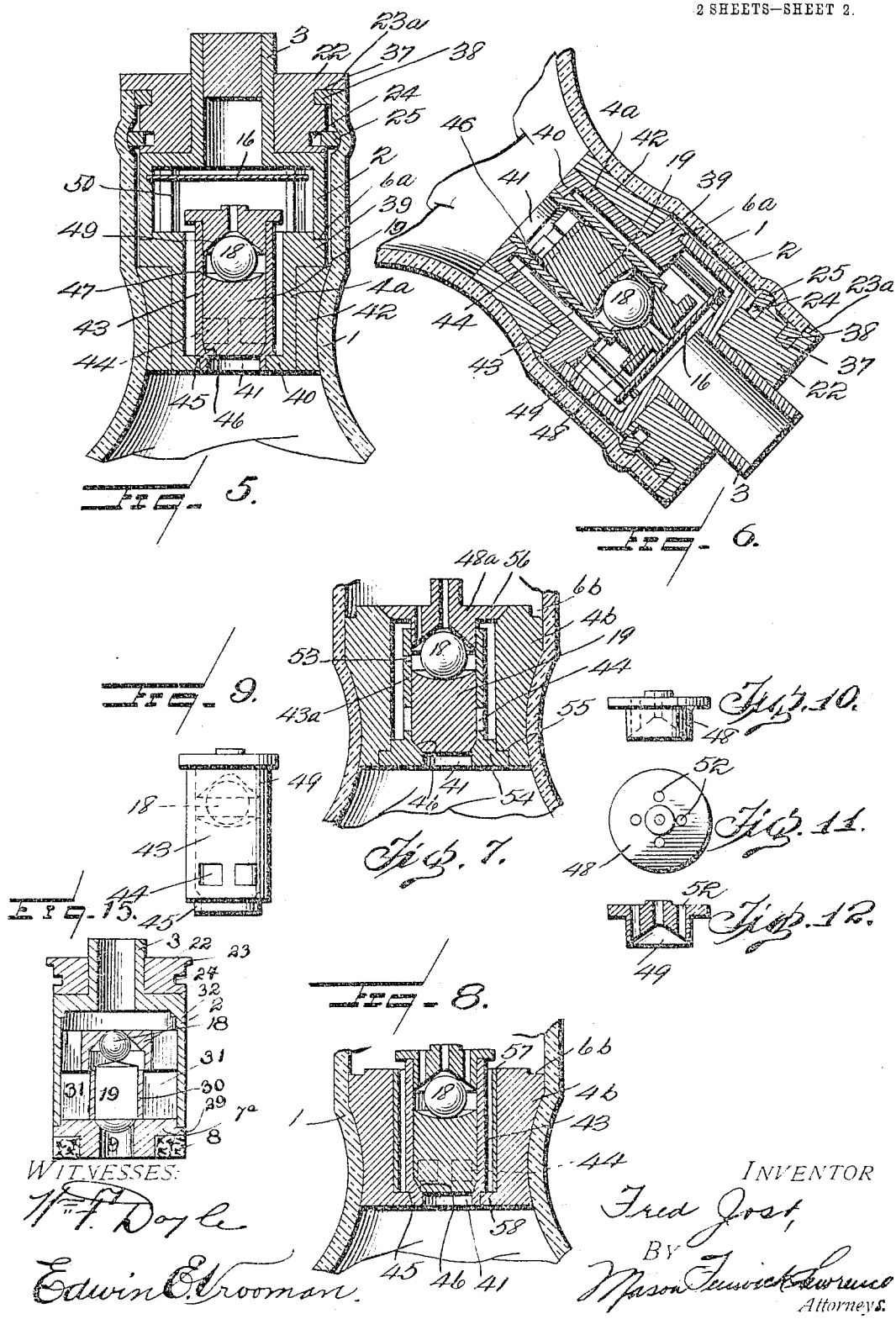

UNITED STATES PATENT OFFICE.

FRED JOST, OF SAN FRANCISCO, CALIFORNIA.

NON-REFILLABLE BOTTLE.

SPECIFICATION forming part of Letters Patent No. 792,991, dated June 20, 1905.

Application filed February 1, 1904. Serial No. 191,536.

*To all whom it may concern:*

Be it known that I, FRED JOST, a citizen of the United States, residing at San Francisco, in the county of San Francisco and State of California, have invented certain new and useful Improvements in Non-Refillable Bottles; and I do hereby declare the following to be a full, clear, and exact description of the invention, such as will enable others skilled in the art to which it appertains to make and use the same.

This invention relates to improvements in non-refillable bottles, and more particularly to that class of improvements set forth in my Letters Patent No. 734,881, issued July 28, 1903.

The object of the invention is to provide means which is adapted to be inserted in the neck of a bottle for the purpose of preventing the filling of said bottle after said means has been placed within said neck.

Another object of the invention is to provide a device which is adapted to retain within the neck of a bottle or the like, said device comprising a suitable casing, a guard retained centrally therein, and a buoyant valve slidably mounted within said casing.

With these and other objects in view the invention consists in the novel construction, combination, and arrangement of parts, as will be hereinafter fully described, illustrated in the accompanying drawings, and more particularly pointed out in the claims hereto appended.

In the drawings, Figure 1 is a vertical sectional view of a device constructed in conformance with my invention, shown in an assembled position within a bottle-neck or the like. Fig. 2 is a similar view to that shown in Fig. 1 except that the device is shown in a horizontal position. Fig. 3 is an inverted sectional view of a device constructed similarly to that shown in Figs. 1 and 2. Fig. 4 is a vertical sectional view of another embodiment of my invention. Fig. 5 is a vertical sectional view of another embodiment of my invention, shown in an assembled position within a bottle-neck or the like. Fig. 6 is a sectional view of a device constructed similarly to that shown in Fig. 5, the same being shown turned downwardly and at an angle to a horizontal plane. Fig. 7 is a fragmentary view of a bottle-neck or the like, showing another embodiment of my invention, which is adapted to be assembled with other suitable members for the purpose of forming a complete device. Fig. 8 is a fragmentary view of a bottle-neck or the like within which is mounted another embodiment of the invention which is employed in the construction of a complete device. Fig. 9 is an auxiliary or secondary casing which is employed in the construction of the embodiment shown in Fig. 8. Figs. 10, 11, and 12 are a side elevation, top plan, and vertical section, respectively, of a secondary or auxiliary member employed in the construction of a complete device. Fig. 13 is a detail fragmentary view of another embodiment of my invention. Fig. 14 is a detail fragmentary view of another embodiment of my invention. Fig. 15 is a detail fragmentary view of another embodiment of my invention.

In the accompanying drawings and the description hereinafter given of the different embodiments of my invention I have disclosed several constructions which illustrate the different modes of construction of the device, and while I have described the different parts coöperating and employed in the completion of a practical structure, using mechanical terms for designating the different parts therefor, it will be obvious to one skilled in the art to which this class of improvements relates that the different parts may be constructed of metal, pottery, glass, or any other suitable material. The material used in the construction of a completed device will be that which is most favorable to the conditions under which the same is constructed, and it will be obvious that other modifications, alterations, and changes may be made in the construction of the device without departing from the spirit and scope of the invention.

The same general spirit of the invention is followed out in the different embodiments of the invention hereinafter described, and the generic structure of the different embodiments will be more particularly specified in detail in describing my preferred embodiments, as follows:

Referring to the drawings, 1 indicates the neck of a suitable bottle or any like receptacle, within which is positively secured a completed device constructed in accordance with my invention.

2 designates a cylindrical upper section of a casing which is adapted to be mounted within the neck of a suitable receptacle, said section 2 being provided with a reduced integral annular extension 3, which is formed of such length as to extend beyond the horizontal plane of the top of the neck of a receptacle when the same is retained therein.

4 designates a cylindrical or annular section which is employed in the construction of the primary casing of the device and which is shown in the drawings as secured to the upper section 2. The inner wall or bore 5 of the member 4 is in shape an inverted frustum of a cone. The annular section 4 is provided with an annular cut-out portion 6, which is adapted to receive the lower end of the section 2 of the primary casing. A lower end section 7 is assembled with the other sections of the primary casing and is positively retained in a fixed position within the neck of a bottle by means of a suitable annular packing member 8, which is formed, preferably, of cork or any suitable material. The section 7 is provided with an annular extension 9, upon which is mounted the packing 8. An integral projection 10 is formed upon the section 7 and is preferably provided with a beveled edge. A cylindrical auxiliary or secondary casing 11 is mounted upon the section 7 and is adapted to encircle and engage the section 10, formed integrally therewith. Said member 11 is provided with a plurality of apertures 12, which are formed within the sides of the member 11 for the purpose of permitting the discharge of the liquids contained within a receptacle within the neck of which a device is mounted. The section 4 is also provided with an annular cut-out portion 13, which is formed for the purpose of receiving the lower end of a cylindrical casing 14. Said casing 14 is provided with a plurality of apertures 15 and is also furnished with a guard 16, which may be formed of any suitable material, and, if desirable, the said guard 16 may be formed integrally with the casing 14. Said casing or member 14 is provided with an inner conical or inclined surface or wall 17, which is constructed for the purpose of assisting in actuating a sphere 18, which is mounted within said casing 14 and which is interposed between said casing and the buoyant primary sliding valve 19. Said buoyant valve 19 is provided with a conical upper surface 20 and with a convexed or curved lower surface or valve-face 21, which is adapted to normally engage its beveled seat in the member 7.

Mounted upon the integral annular extension 3 of the primary section 2 is an annular locking member 22, which may or may not be provided with an integral annular extension 23, extending beyond the vertical plane of the inner wall of the neck of the receptacle within which the device is mounted. Said locking member 22 is provided with an annular recessed or cut-out portion 24, which is formed upon said member 22 for the purpose of receiving a suitable locking member 25, which is preferably formed of metal having a resilient action. Upon the inner wall of the neck of the receptacle within which the device is to be retained is provided a cut-out portion or groove 26, which is formed for the purpose of receiving said locking member 25 when the device is mounted within the neck of a receptacle.

Interposed between the inner wall of the neck of the receptacle and the locking member 22 and between the member 25 and the extension 23 of the locking member 22 is preferably a suitable flexible packing or ring 27, which is assembled with the said locking member 22 for the purpose of providing means for preventing any lateral play of the parts when in an assembled position within the neck of a receptacle, and thereby preventing the rattling of the device when retained within the neck of a receptacle, and this packing might be replaced with some such material as cement. It will be apparent that the locking member 22 may also perform the function of a packing for the completed device, as well as the member 8, which is secured upon the extension 9, formed upon section 7.

The guard 16 may be an integral portion of the member 14, and while I have shown the same as a disk formed of glass or any suitable material in the accompanying drawings the said guard may be formed of any suitable shape and of any desirable material.

In the embodiment shown in Fig. 4 the section 2 is formed with a comparatively long cylindrical extension 28, which is adapted to engage and rest upon an annular cut-out portion 29, formed upon the section 7ᵃ of a completed device. In this embodiment the section 7ᵃ is shown as constructed of a width greater than that shown in the embodiment disclosed in Figs. 1 to 3 of the drawings. An annular packing 8, of cork or any suitable material, is mounted upon the extension 9 of the section 7ᵃ of this embodiment. The buoyant valve 19 is slidably retained within an auxiliary sliding member 30. Said buoyant valve 19 is similarly constructed to the valve shown in Figs. 1 to 3. Formed integral with the casing 30 is a plurality of ribs 31, which engage the inner wall of the section 2, and thereby positively retain the buoyant valve 19 in an assembled position relative to the other parts of a completed device. Secured within the cylindrical section 2 of the primary casing is a member 32. Said member 32 is provided with a plurality of ribs 33, extending laterally therefrom and formed integrally therewith. In this embodiment I have not shown the guard member 16 as being formed of a separate section and of different material from that of the member 32; but I have shown an integral extension or portion of the member 32, which performs the function of a guard, and thereby prevents the tampering with the valve mechanism of the device. In the embodiment shown in Fig. 4 there is not formed any apertures within the walls of the member 30 or 32, for the reason that the operation of the parts employed in completing a device constructed in conformance with this embodiment is different and the members coöperating with the valve 19 and its sphere 18 are differently constructed from other embodiments. If it is desired, the sphere-receiving member 32 may be slidably mounted within the cylindrical section 2, as shown in Fig. 15, and if this alteration is resorted to it will be obvious that the weight of this member 32 will also coöperate with the sphere 18 in forcing the buoyant valve 19 into a closed position. When it is desired to discharge the liquids contained in the receptacle within the neck of which a device constructed in accordance with the embodiment shown in Fig. 4 is mounted, the said receptacle provided with a completed device may be turned to a position so that the pressure of the liquids within the receptacle will raise or force from its seat the valve 19, and if the angle to which the receptacle is turned is of such a degree as to permit of the sliding member 30 to move from the position shown in the drawings the liquids contained within the receptacle will pass beneath the convexed face of the valve 19 between the parallel ribs 31 and 33 and will be discharged through the cylindrical or annular extension of the section 2 of the primary casing.

I have shown in Fig. 13 of the drawings another embodiment of the auxiliary or secondary casing 11 which is shown in Figs. 1 to 3 of the drawings. This casing 11ª is provided with a plurality of integral laterally-extending ribs 34, which are of the same length as the casing 11ª. In this construction instead of providing a plurality of apertures near the lower end of the casing I have made the casing 11ª of such length as to terminate near the extension 10 of the section 7, and by constructing the casing 11ª with the ribs 34 the same is retained in a fixed position within the primary casing and in such a position as will permit of the liquids contained within a receptacle within which a device constructed in accordance with my invention is mounted to pass beneath the buoyant valve 19 and between the parallel ribs 34 of the casing 11ª, and, as heretofore described for the other embodiments of the invention, the liquids will be discharged through the apertures 15 of the sphere-inclosing casing 14, thence around said casing 14 and through the discharge extension 3 of the primary casing.

In Fig. 14 I have shown the section 4 as not provided with an inverted frustum of a cone, as shown in some of the other figures of the drawings, but have provided a cylindrical casing 35, which is provided with a plurality of apertures 36 with a conical outer wall or surface. The different parts employed in the construction of a device in accordance with this embodiment are similarly arranged and constructed as heretofore described for the other embodiments.

If it is desired, in the construction shown in Figs. 1, 2, 3, and 14 a plurality of parallel ribs 34 may be secured to the casings 11 and 35, said ribs provided for the purpose of centering the said casings, thereby positively retaining the same in a fixed position within their respective primary casings.

The general construction shown in Figs. 5 and 6 is similar to that disclosed in my Letters Patent No. 734,881, patented July 28, 1903, and for such detail description as is not furnished in this specification of this structure reference may be had to said patent. In the construction shown in Figs. 5 and 6 the locking member 22 is mounted upon the periphery of the cylindrical extension 3 of the upper section 2 of the primary casing. Said locking member 22 may or may not be provided with an integral extension 23ª, which projects and extends to the same vertical plane within which the sides of the neck of the receptacle are formed. An annular groove 37 is formed upon the periphery of the locking member and is adapted to receive a flexible packing member or ring 38, which is provided for the purpose of forming a packing between the locking member and the inner wall of the neck of the receptacle within which a device is mounted, and said member 38 also prevents any lateral movement of the device within the neck. The lower section 4ª is provided with an annular extension 39, which is formed with a seat or cut-out portion 6ª for the reception of the section 2. An integral annular extension 40 is formed upon the lower portion of the section 4ª and extends toward the center of said member 4ª and provides a central aperture 41, through which the liquids are discharged. Mounted upon the periphery of the section 4ª is a packing or annular locking member 42, which may be formed of cork or like material and which is provided for the purpose of positively retaining the lower portion of a completed device within the neck of a suitable receptacle and which prevents any movement of the lower portion of the device. Assembled within the section 4ª is an auxiliary or secondary casing 43, which is preferably cylindrical in shape and which is provided with a plurality of apertures 44, formed near the lower end thereof. In the construction shown in Figs. 5 and 6 this auxiliary casing 43 is provided with annular cut-out or seat portions 45, which are adapted to engage and rest upon the inner edge of the annular extension 40 of said member $4^a$. Upon the inner walls of the member 43 is formed a beveled edge 46, which is adapted to be normally engaged by a corresponding surface formed upon the valve 19, which is slidably retained within the auxiliary member 43. Said valve 19 is preferably provided with a lower flat end and an upper concaved end portion 47. Said valve 19 is preferably formed of any material which will permit of a buoyant action of said valve member and may be formed of any desired shape which will permit of the desired results. A sphere or ball 18 is mounted upon the valve member 19 and is normally engaged by the secondary valve member 48, which is provided with a conical or beveled end surface 49 and is also formed with a central aperture which communicates with a central compartment formed within the primary casing. A central integral extension is formed upon the top of said member 48 and is adapted to engage a guard member 16, which is retained in an assembled position with the other parts by means of supports 50, which are specifically described in my Letters Patent No. 734,881.

In the drawings Figs. 10, 11, and 12 the auxiliary valve member 48 is formed with a plurality of apertures 52 upon the body portion thereof, permitting of the passage of liquids therethrough when the said member 48 is retained in an assembled position within a completed device.

In Fig. 7 I have shown only the lower section or portion of a device adapted to be retained within the neck of a suitable receptacle, and in this construction I have formed upon the section $4^b$ an annular groove or seat $6^b$, which is adapted to receive the lower end of the upper section of the primary casing. The auxiliary casing $43^a$ is provided with a plurality of apertures 44 and is also formed with secondary apertures 53 upon the side thereof and in the upper portion of said member $43^a$. The annular integral extension 54 is formed upon the lower end of the casing $43^a$ and is also provided with a seat or cut-out portion 55, which is formed for the reception of the corresponding portion of the section of packing $4^b$. The valve 19 is formed similarly to the construction shown in Figs. 5 and 6; but it will be obvious that said valve can be formed hollow and produce a practical device by means of any suitable material which will permit of a buoyant action. In this embodiment (shown in Fig. 7) the auxiliary casing $43^a$ is of less length than the packing or member $4^b$ and owing to this construction and the peculiar formation of the auxiliary or secondary valve member $48^a$ the said member $48^a$, which is provided with an annular beveled extension 56, is adapted to form a closed compartment between the members $4^b$ and $43^a$ when the valve member and its cooperating parts are in their normal closed position. In this construction the central integral extension, which is provided with an aperture, is of greater length than the extension shown in the other modifications and is so constructed for the purpose of limiting the sliding movement of the said member $48^a$ and the valve 19 by means of the said extension coming in contact with the centrally-arranged guard member. If it is preferred a suitable casing 57, as shown in Fig. 8, may be interposed between the outer wall of the casing $43^a$ and the inner wall of the member $4^b$, as said member $4^b$ may be formed of such material as would be affected by the contents contained within the neck of which the device is mounted, or if $4^b$ is of cork this casing 57 will tend to prevent the liquid passage-way from getting congested, as by swelling of the cork. Such changes will be apparent to one versed in this art and are reserved by me so far as the scope of my invention will permit thereof in constructing the device in accordance with my invention.

Referring more particularly to Fig. 8 of the drawings, in which are the lower sections or members employed in constructing the completed device, I have shown the packing or member $4^b$ provided with a seat portion $6^b$, as heretofore described, and said member $4^b$ is provided with an integral extension 58, which is adapted to receive a cylindrical auxiliary casing 43. The essential difference between this embodiment and that shown in Figs. 5, 6, and 7 is that I interpose a casing, preferably formed cylindrical in shape, between the auxiliary casing 43 and member $4^b$, which prevents the liquids which are passed through the compartment formed between casing 43 and member $4^b$ from coming in contact with the inner wall of the member $4^b$ and maintain a passage-way of constant size, as when $4^b$ is of cork.

The actuation of the valve mechanism is practically the same in all the embodiments, and I will describe fully the operation of my preferred construction shown in Figs. 1 to 3 and will also describe fully the operation of the valve mechanism employing the auxiliary valve member 48. (Shown in Figs. 5 to 8.) When the completed device is inserted into the neck of a receptacle and is positively retained therein by means of the locking member 25, if it is desired to discharge liquids through said device the actuation of the valve mechanism depends upon the amount of liquid contained within the receptacle.

In the constructions shown in Figs. 5 to 8 the auxiliary or secondary member 48 and $48^a$ is adapted to be limited in its sliding movement by means of the centrally-arranged guard, which is shown in Figs. 5 and 6 mounted upon suitable supports, which are specifically described in my prior Letters Patent. In these embodiments the weight of the member 48 and 48ᵃ is also added to that of the sphere 18, thereby materially assisting in positively actuating the valve 19, retaining the same in its normal closed position when said device is not moved to a downward position outside of the horizontal plane of the vertical position.

The valve mechanism in the different embodiments which have been fully described in the foregoing description and shown in the accompanying drawings performs practically the same function in all of said embodiments, and while any liquids inserted into or entering the central compartment of the primary casing would assist in moving the valve into a position whereby the receptacle could not be refilled fraudulently the positive actuation of the valve member is not obtained by such insertion of liquids, but such action is produced by the construction of the coacting parts which are normally engaged by the sphere member interposed therebetween. It will be obvious that a suitable stopper, as shown in Fig. 5, may be inserted into the hollow extension which projects beyond the upper portion of the receptacle, and such stopper may be formed from any suitable material.

If the receptacle within which the device is mounted contains liquids and it is desired to pour said liquids therefrom, this operation can be obtained by sufficiently inclining the receptacle from the vertical upright position, thereby causing the actuation of the valve mechanism, which actuation will depend on the amount of liquids contained in the receptacle. As the inclination is increased the force of gravity, which tends to maintain the closed valve, is decreased, and as the inclination is continued and the liquid contained in the receptacle comes into contact with the valve-face the liquid-pressure tending to open the valve is increased until in an inverted vertical position it is at a maximum. It is obvious that when this liquid-pressure is in excess of the above gravity-pressure, which tends to maintain a closed valve, the valve will open and allow the outflow of the contents of the receptacle.

Referring more particularly to Fig. 2 of the drawings, the valve will open if the liquid-pressure, tending to open the same, is in excess of those forces holding the same closed, and such action will mainly depend on the weight of the sphere and the slope given to the surface of member 14 and like members in other figures. It is thus seen that as the receptacle is inclined, as in the act of pouring, the forces holding the valve closed gradually give way to those tending to open said valve, and the same will be open or closed accordingly as one of the forces or the other is greater.

Referring to Fig. 1, I will also state the reason why the inner surface of member 4 is formed as the inverted frustum of a cone, as shown. In the erect position of the device no liquid can enter the receptacle, as the valve is maintained closed by reason of the weight of the valve members. As the receptacle is inclined the combined resistance of these parts, which tend to maintain a closed valve, gradually decreases until the device is placed in a position similar to that shown in Fig. 3, when the valve opens by reason of the weight of the parts acting in a reverse direction from that of a normally closed position of said members. In this position it might now be possible for liquid to enter the receptacle by sufficiently submerging the receptacle in a liquid and under other favorable conditions were it not for the fact that the function of the buoyant valve is now obtained. When any liquid seeking ingress in this or the like position surrounds the valve, it will float the valve and cause the same to assume a closed position. In the erect position the sphere, by reason of the form given the upper end of the valve, occupies a position at one side of the device and rests against the surface of the valve and member 14. Said sphere is thus reacting against these surfaces, thereby tending to lessen any liability by which the valve may have to be removed from its closed position by shaking the receptacle within which the device is mounted. If the device in this position contains liquids and it is attempted to transfer said liquids to the receptacle by shaking, then the advantages forming the inner surface of member 4, as described, will be apparent. By a construction similar to that shown in the drawings of member 4 the shaking of the device will cause any liquids contained therein to be thrown upward and not to move into a more congested space, and therefore the liquid momentum is not converted into such a static pressure as will result if the space were congested upward. If the static pressure was increased, there would be produced a corresponding tendency for liquids to enter the receptacle should it tend to find its way to said receptacle and the valve being opened. Not only does the liquid which is seeking ingress into the receptacle aid in closing the valve, but the sphere will also ride down the conical or beveled inner surface of the member interposed between the guard member and the valve and will thereby assist materially in the actuation of said valve member. The sphere itself will positively actuate and move valve 19 in its normal closed position when the receptacle is empty and not so inclined from the vertical upright position as will result in the sphere seeking a position toward the guard by reason of gravity acting on the same and on the valve when the valve falls away from its seat.

Fig. 15 is constructed similarly to the embodiment depicted in Fig. 4, except the members 30 and 32 are slidably mounted within the sectional primary casing. It will be apparent from this construction and the embodiment shown in Fig. 4 that if it is desired either of the members 30 and 32 may be retained in a stationary position; but it is preferable to either secure both of the members in a stationary position or to movably mount them within the primary casing.

Numerous modifications, alterations, and changes may be made in the construction of a completed device in accordance with my invention. Various materials may be employed in the formation of the different parts of this invention, and various modes of construction may be resorted to in the formation of said parts, and while I have not specifically designated all these different alterations, modifications, and embodiments, nor have I designated the exact material which may be employed in the construction of the different parts in every instance, nor the mode whereby each part may be made, I wish it to be understood that I reserve the right to make all such changes, alterations, and modifications and to construct the invention out of any material desired and employing any means possible so far as such will not sacrifice the spirit of the invention and shall fairly fall within the scope thereof.

Having thus fully described my invention, what I claim as new, and desire to secure by Letters Patent, is—

1. A device of the character described, comprising a primary casing, a valve-casing mounted within said primary casing, a guard-casing having a conical inner surface mounted above said valve-casing, valve means mounted within said valve and guard-casings, and locking means carried by said primary casing.

2. In a device of the character described, the combination with a neck, of a sectional casing mounted therein, locking means carried by said casing, guard means provided with a conical inner surface mounted within said casing, valve-guiding means mounted within said casing below said guard means, a valve mounted within said casing below said guard means and in engagement with said guiding means, and movable, auxiliary valve means interposed between said valve and guard means for positively retaining said valve in its seated position.

3. In combination with a receptacle having an opening, a device mounted within said opening, comprising a casing, a stationary auxiliary casing mounted within the lower portion of said casing, a valve mounted within said auxiliary casing, a sphere mounted above said valve, and guard means extending transversely of said casing and adapted to limit movement of said sphere and valve.

4. In combination with a bottle-neck or the like, a casing provided with hollow extensions of approximately the same diameter projecting therefrom in different directions, a guard member carried within said casing, guiding means mounted within said casing, a sliding valve interposed between said guard member and one of said extensions within said guiding means, and movable auxiliary valve means interposed between said valve and guard member for assisting in seating said valve.

5. In a device of the character described, the combination with the neck of a suitable receptacle, of a sectional casing provided with hollow extensions projecting in opposite directions positively retained within said neck, the inner wall of one of said sections of said casing formed in shape of an inverted frustum of a cone, a sliding valve mounted within said casing, guiding means for said valve, and guarding means and actuating means for said valve mounted within said casing.

6. A device of the character described, comprising a sectional casing, a plurality of auxiliary stationary sections having a valve-opening mounted within said casing, and movable means mounted within each of said auxiliary sections for closing said valve-opening when in a seated position.

7. A device of the character described, comprising a primary casing formed of a plurality of hollow sections, a plurality of apertured, auxiliary sections retained within said casing, a valve mounted within one of said sections and a valve-actuating member mounted in the other section.

8. A device of the character described, comprising a casing formed of a plurality of sections, an apertured hollow auxiliary casing secured within said primary casing near the lower portion thereof, a valve slidably mounted within said auxiliary casing, a guard-casing having a conical inner face mounted above said auxiliary casing, and means movably mounted within said guard-casing normally engaging said valve for positively retaining said valve in its normal position.

9. In a device of the character described, the combination with the neck of a suitable receptacle, of a sectional casing mounted therein, a plurality of hollow extensions projecting from said casing, locking means carried by said extensions, a guiding-casing mounted within said primary casing, sliding valve means mounted within said guiding-casing, an apertured casing mounted above said guiding-casing and secured centrally within said primary casing, and movable auxiliary valve-actuating means carried within said apertured casing normally engaging said sliding valve means secured within said guiding-casing 10. In a device of the character described, the combination with the neck of a receptacle, of a primary casing mounted within said neck, locking means carried by said casing near each end thereof, a valve and a guard-casing positioned within said primary casing, said valve-casing having an aperture formed upon its side, and valve means mounted within said valve-casing.

11. A non-refillable-bottle apparatus, comprising a cylindrical sectional casing, annular locking means mounted upon said cylindrical casing, a plurality of auxiliary casings mounted within said cylindrical casing one of said auxiliary casings having a plurality of apertures formed therein, and valve means movably mounted within said auxiliary casings for positively closing said openings formed within one of said casings.

12. A non-refillable-bottle device, comprising a sectional, cylindrical casing, hollow, integral extensions projecting in opposite directions from said casing, cylindrical, apertured, secondary casings mounted therein, a buoyant valve movably mounted within said apertured casings, and means for positively moving said valve to a seated position.

13. In a device of the character described, the combination with the neck of a suitable receptacle, of a cylindrical sectional primary casing, said primary casing provided with a plurality of hollow, integral extensions, locking means carried upon each of said extensions, a casing provided with a conical surface retained within said primary casing, a cylindrical apertured guiding-casing mounted within said primary casing, a valve slidably mounted within said guiding-casing and provided with an upper surface formed at an angle to a horizontal plane, and a sphere interposed between said valve and conical-surfaced casing and normally engaging said valve.

14. A device of the character described, comprising a casing, an apertured, hollow, auxiliary casing mounted within said primary casing near the bottom thereof, a valve slidably mounted within said auxiliary casing, guard means mounted above said auxiliary casing, and movable auxiliary valve means interposed between said guard means and valve for positively retaining said valve in a seated position.

15. A device of the character described, comprising a sectional casing provided with hollow, reduced extensions projecting from each end thereof, the inner wall of one of said sections shaped as an inverted frustum of a cone, guard means having a conical-shaped inner surface mounted within and secured transversely of said casing, a sliding valve mounted below said conical-shaped guard means, and a sphere interposed between said valve and guard means.

16. A non-refillable-bottle apparatus, comprising a sectional casing provided with integral, hollow extensions, packing means carried by each of said extensions, locking means mounted upon one of said packing means, an auxiliary casing mounted within said sectional casing, guard means assembled within said sectional casing, a valve slidably mounted within said auxiliary casing, comprising a body portion having convexed end portions, and an auxiliary valve member interposed between said valve and guard means.

17. A device of the character described, comprising a sectional, cylindrical casing, a plurality of integral cylindrical extensions projecting therefrom, locking means mounted upon each of said extensions, a guard mounted within said casing, guiding means mounted within said casing, a valve mounted within said guiding means, an auxiliary valve-actuating member mounted within said casing above said valve, and means for positively retaining said auxiliary valve-actuating member in engagement with said valve.

18. In a device of the character described, the combination of a plurality of cylindrical sections mounted in an assembled position within said neck, a packing secured upon each of said sections near their outer ends, a valve-casing having openings formed in each end mounted within one of said sections, a guard assembled within said sections, and valve means mounted within said valve-casing.

19. A device of the character described, comprising a casing provided with a plurality of hollow integral extensions projecting in opposite directions therefrom, said casing provided with an inverted-frusto-conical surface, and valve means mounted within said casing.

20. A device of the character described, comprising a sectional casing provided with diametrically opposite hollow extensions, one of said sections provided with an inverted-frusto-conical surface, and guard and valve means mounted within said casing.

21. A device of the character described, comprising a casing provided with opposite, hollow extensions, said casing provided with an inverted-frusto-conical surface, and valve means mounted within said casing.

In testimony whereof I hereunto affix my signature in presence of two witnesses.

FRED JOST.

Witnesses:
H. W. ROEDING,
E. G. EISEN.